March 6, 1945.  R. R. ROHL  2,370,918
WOODWORKING
Filed Aug. 6, 1941  3 Sheets-Sheet 1

Inventor
Robert R. Rohl,
Robert F. Beck,
By
Attorney

March 6, 1945.  R. R. ROHL  2,370,918
WOODWORKING
Filed Aug. 6, 1941   3 Sheets-Sheet 2
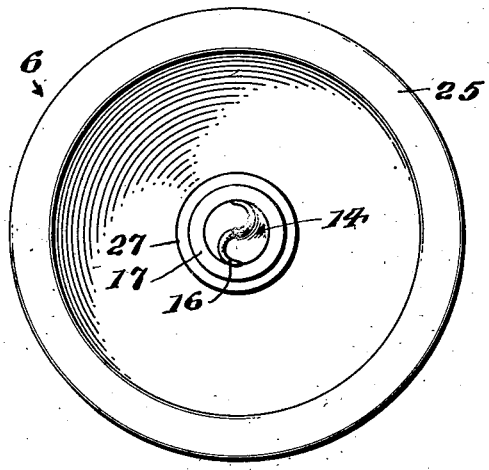
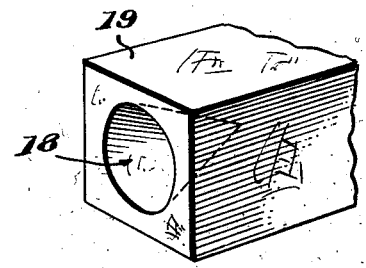
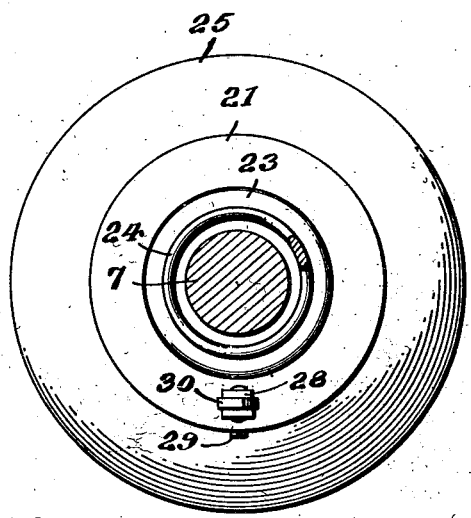
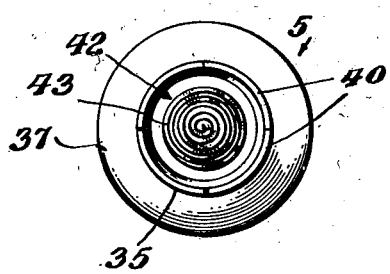
Inventor
Robert R. Rohl,
Robert F. Beck,
By
Attorney March 6, 1945.　　　　R. R. ROHL　　　　2,370,918
WOODWORKING
Filed Aug. 6, 1941　　　　3 Sheets-Sheet 3
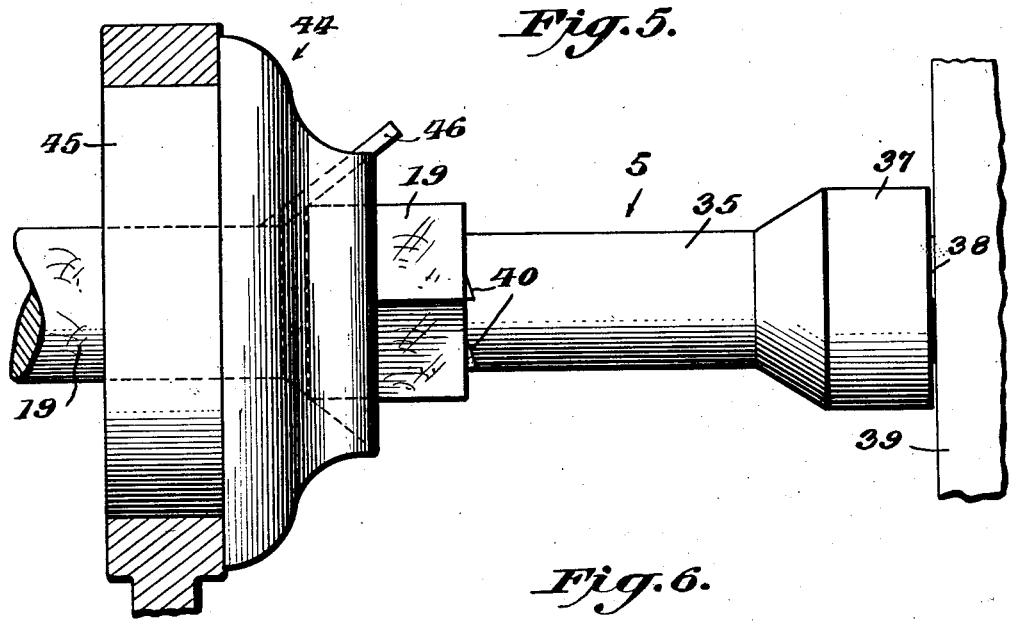
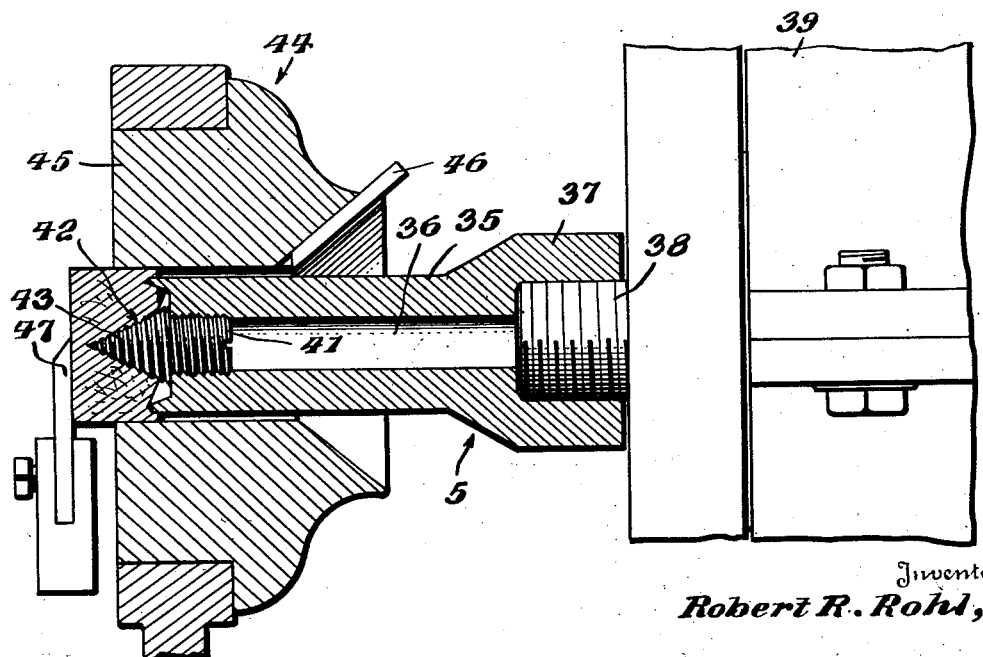
Inventor
Robert R. Rohl,
By Robert F. Beck,
Attorney Patented Mar. 6, 1945

2,370,918

UNITED STATES PATENT OFFICE 2,370,918

WOODWORKING

Robert R. Rohl, Menasha, Wis., assignor of one-half to Norman E. Brokaw, Sr., Appleton, Wis.

Application August 6, 1941, Serial No. 405,714

3 Claims. (Cl. 142—53)

My invention relates to woodworking and more particularly to a method and means whereby stock or work-pieces are prepared and held upon turning lathes.

In the type of wood turning lathe wherein the stock or work-piece is supported at one end by a screw chuck and a traveling cutter is shiftably longitudinally mounted on the stock for reducing the diameter of the same, at least one severing knife is employed to sever the stock adjacent the cutter when the latter has completed its reducing operation. The severing knife is disposed in proximity to the distal end face of the cutter with respect to the chuck. The chuck is fashioned with a head provided with internal screw threads which engage and secure the end of the stock to the chuck, the stock being usually of a square configuration in cross section. The head of the chuck being of a materially greater diameter than the stock precludes admittance of the chuck within the cutter, thus when the stock is severed, that portion of the stock remaining within the cutter is wasted.

Inasmuch as this wasted stock constitutes an important item in manufacture from an economic standpoint, it is desirable that the amount of waste be materially reduced. It is therefore one of the objects of my invention to provide means whereby the entire end of the stock secured to the chuck may be disposed within the cutter thereby appreciably reducing the amount of waste stock.

Another object of my invention is to provide a chuck so constructed and arranged as to extend an appreciable distance within the cutter thereby appreciably reducing the amount of waste stock.

A further object of my invention is to provide means for conditioning the end of the stock in a manner that the stock may be effectively gripped and secured to a chuck capable of extending into the cutter.

A still further object of my invention is to provide a method for conditioning the ends of work-pieces or stock in a manner that the same may be secured to a chuck capable of extending into the cutter for forming the stock into a desired pattern.

An important object of my invention is to provide means of the character described which is simple in construction, durable in use, efficient in operation and economical in manufacture.

With the above and other objects in view, as will hereinafter appear, the invention consists in the combination, and arrangement of parts hereinafter set forth and illustrated in the accompanying drawings, from which the several features of the invention and the advantages attained thereby will be readily understood by those skilled in the art.

Referring to the drawings wherein like reference characters designate like parts throughout the several views:

Figure 3 is a front elevation of the centering device.

Figure 4 is a sectional view taken on the line 4—4 of Figure 1.

Figure 5 is a side elevation of the chuck in assembled relation with certain parts of the lathe.

Figure 6 is a vertical sectional view of the chuck and certain of the parts of the lathe.

Figure 7 is a front end elevation of the chuck.

Figure 8 is a detail perspective view of one end of a work-piece or stock.

Figure 1:
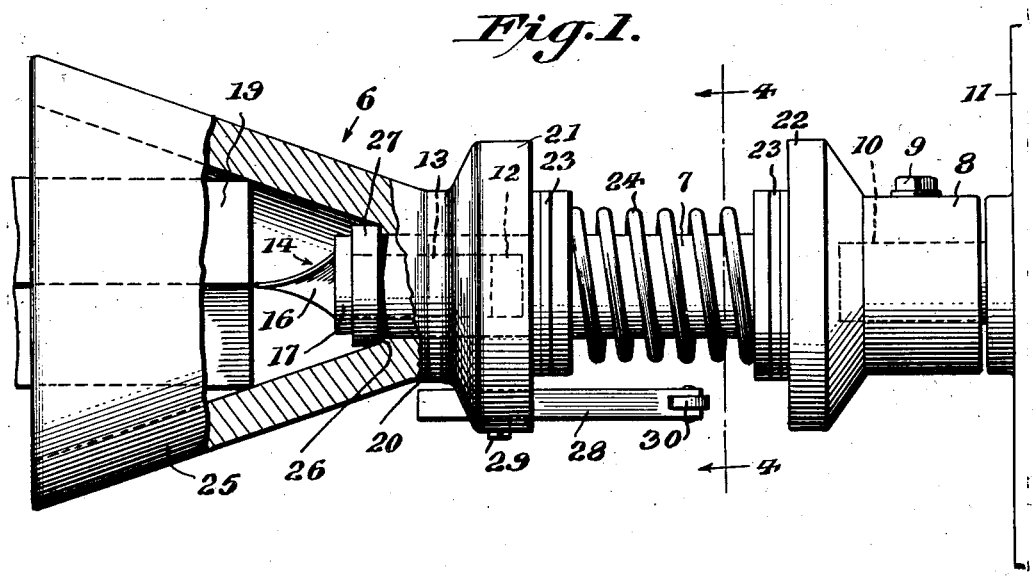
Figure 1 is a side elevation, partly in section, of the centering or drilling device.

In practising my invention, as illustrated in the drawings, I employ a pair of cooperating units constituting a chuck and a centering or drilling device 5 and 6 respectively. As disclosed in Figures 1 to 4 inclusive, the device 6 comprises a shaft 7 provided at its rear end with a sleeve 8 in which is fixed thereto, by means of a set screw 9, a drive shaft 10 of a motor 11 or other suitable source of power for effecting rotation of the shaft 7.

The front end of the shaft 7 is formed with a socket or cul-de-sac 12 in which is disposed the shank 13 of a dril 14. The shank of the drill is detachably secured within the socket 12 by means of a radially disposed set screw 14 threadedly carried by the shaft 7 as clearly illustrated in Figure 2. The front end of the drill is provided with a bit 16 extending forwardly from a collar 17, the latter being interposed between the bit and shank and engaging the front radial face of the shank 7. The bit 16 is of a configuration to drill a conical-shaped opening 18 into the end face of a work piece or stock 19 when the latter is presented to the drill in a manner hereinafter more fully disclosed.

Mounted on the shaft 7 for relative rotation therewith, is a sleeve 20 having its rear end formed with a collar 21 disposed in spaced relation with a collar 22 formed on the front end of the sleeve 8. Sleeved upon the shaft 7 and in engagement with the opposed faces of the collars 21 and 22 are a pair of thrust ball bearing assemblies 23, the latter having interposed therebetween a coil spring 24 engaging the opposed faces of the assemblies 23 and serving to urge the sleeve 20 away from the sleeve 8.

The front end of the sleeve 20 is fashioned with a forwardly extending frustum-shaped skirt 25 and with the rear end of said skirt coacting with the sleeve to define an interior shoulder or abutment 26 circumferentially disposed about the shaft 7.

The front end of the shaft 7 is formed with a collar 27 coacting with the shoulder 26 to limit the outward movement of the sleeve 20 by the spring 24. The collar 21 is fashioned with a slot in which is disposed a longitudinally extending bar 28 adjustably secured to the collar 21 by means of a set screw 29. The rear end of the bar 28 is provided with a roller 30 for engaging the front radial face of the collar 22 whereby to limit the movement of the sleeve 20 toward the sleeve 8.

The sleeve 20 is formed with a radially extending lubricant opening 31 whereby a suitable lubricant, for instance, oil, may be introduced about the shaft 7 for lubricating the same during rotation of said shaft within the sleeve 20. When the collar 27 is in engagement with the shoulder 26, the set screw 15 is disposed within the confines of the opening 31, thus permitting ready access to said set screw to permit insertion and removal of the drill 14.

Figure 2:
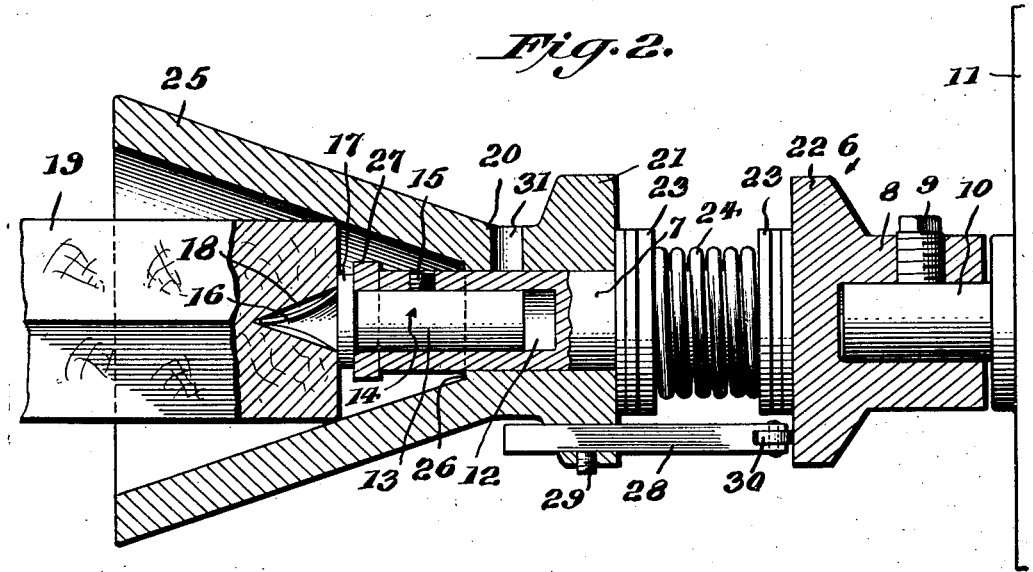
Figure 2 is a vertical sectional view of the drilling device and illustrating certain of the parts in a different position with respect to Figure 1.

In use, it being understood that the parts are in the positions illustrated in Figure 1 and the shaft 7 is being driven to effect rotation of the bit 16, the end of the stock or work-piece 19 is inserted within the skirt 25 and moved with said skirt toward the drill 14 to effect the drilling the conical-shaped opening 18 in the end of the stock as clearly illustrated in Figure 2. When the end of the stock is thus drilled, it is removed from the skirt and secured to the chuck 5 as hereinafter more fully described.

The chuck 5 comprises a cylindriform member 35 formed with a centrally disposed and longitudinally extending bore 36. The rear end of the chuck 5 is formed with an interiorly threaded collar 37 connected to the spindle 38 of a lathe 39. The front face of the chuck 5 is fashioned about its periphery with a quaternary of stock penetrating or engaging teeth or spurs 40 while the bore 36, postjacent said front face, is provided with threads for threadedly receiving therein the threaded shank 41 of a stud 42, the latter being provided, at its front end, with a conical-shaped screw threaded head 43 for disposal within the opening 18 of the stock 19 whereby to secure said stock to the chuck, it being understood that as the head 42 is threaded into the stock, the teeth or spurs 40 penetrate the end face of the stock and effect driving relation therewith while the stud serves to secure the stock in fixed and centralized relation with the chuck.

As illustrated in Figures 5 and 6, the lathe is provided with the usual cutter 44 comprising a head 45 in which is disposed a forming knife 46 for reducing the stock to a desired diameter. Adjacent the front or distal end face with respect to the spindle 38, there is provided the usual severing knife 47 for severing the stock into desired lengths in the customary manner. Prejacent the collar 37, the chuck 5 is of a lesser diameter than the opening in the head 45 through which the stock 19 is advanced. In the operation of the chuck, assuming that the same is connected to the end of the stock as heretofore described and as illustrated in Figure 5, the head 45 is advanced about the stock and toward the spindle 38, thus, reducing the stock to a desired diameter. Due to the fact that the chuck 5, prejacent the collar 37, is of a lesser diameter than the reduced diameter of the stock, the head 45 will be advanced over an appreciable portion of the chuck thereby enabling the stock to be severed at a point in close proximity to the front end of the stud 42, thus materially reducing the amount of waste stock.

As illustrated in the drawings, the inner circumferential faces of the teeth 40 are tapered to preclude splitting of the stock when the stud 42 is advanced into the opening 18.

Without further elaboration the foregoing will so fully explain the invention that others may, by applying current knowledge, readily adapt the same for use under various conditions of service. Moreover, it is not indispensable that all the features of the invention be used conjointly since they may be employed advantageously in various combinations and sub-combinations.

It is obvious that the invention is not confined to the herein described use therefor as it may be utilized for any purpose to which it is adaptable. It is therefore to be understood that the invention is not limited to the specific construction as illustrated and described as the same is only illustrative of the principles of operation, which are capable of extended application in various forms, and that the invention comprehends all construction within the scope of the appended claims.

What I claim is:

1. In combination, a cutter head of the type provided with a work-piece receiving opening and a forming knife extending therein for reducing the diameter of a work-piece upon advance of the work-piece through said opening, a chuck having one end adapted to be secured to the end of a spindle for unitary rotation therewith, and means on the opposite end of said chuck for engaging the end face of a workpiece for effecting driving relation with said work-piece and for securing said work-piece in fixed relation with said chuck, said chuck being of a diameter to permit said opposite end to extend through said opening and beyond said knife as the workpiece is advanced through said opening and beyond the knife.

2. In combination, a cutter head of the type provided with a work-piece receiving opening and a forming knife extending therein, for reducing the diameter of a work-piece upon advance of the work-piece through said opening, a chuck having one end adapted to be secured to the end of a spindle for unitary rotation therewith, the opposite end of said chuck being formed on its face with teeth adapted to engage the end face of a work-piece for effecting driving relation with said work-piece, and means carried by said opposite end for disposal within said end face of said work-piece for securing said work-piece in fixed relation with said chuck, said chuck being of a diameter to permit said opposite end to extend through said opening and beyond said knife as the work-piece is advanced through said opening and beyond the knife.

3. In combination, a cutter head of the type provided with a work-piece receiving opening and a forming knife extending therein for reducing the diameter of a workpiece upon advance of the work-piece through said opening, a chuck having one end adapted to be secured to the end of a spindle for unitary rotation therewith, the opposite end of said chuck being formed on its face with teeth adapted to engage the end face of a work-piece for effecting driving relation with said work-piece, and a threaded conical member carried by said opposite end for disposal within said end face of said work-piece for securing said work-piece in fixed relation with said chuck, said chuck being of a diameter to permit said opposite end to extend through said opening and beyond said knife as the work-piece is advanced through said opening and beyond the knife.

ROBERT R. ROHL.